No. 787,302. PATENTED APR. 11, 1905.
M. C. A. LATOUR.
SINGLE PHASE DYNAMO ELECTRIC MACHINE.
APPLICATION FILED AUG. 30, 1904.
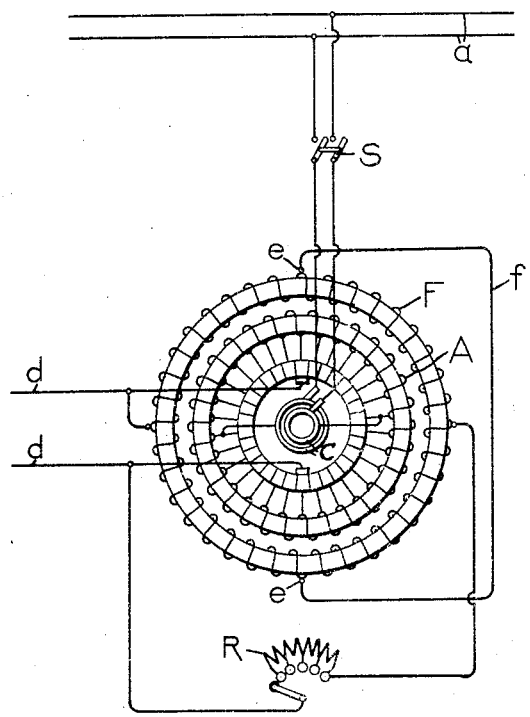
Witnesses.
Inventor:
Marius C. A. Latour.
by Albert H. Davis
Att'y.

No. 787,302. Patented April 11, 1905.

UNITED STATES PATENT OFFICE.

MARIUS CHARLS ARTHUR LATOUR, OF PARIS, FRANCE, ASSIGNOR TO GENERAL ELECTRIC COMPANY, A CORPORATION OF NEW YORK.

SINGLE-PHASE DYNAMO-ELECTRIC MACHINE.

SPECIFICATION forming part of Letters Patent No. 787,302, dated April 11, 1905.

Application filed August 30, 1904. Serial No. 222,683.

*To all whom it may concern:*

Be it known that I, MARIUS CHARLS ARTHUR LATOUR, a citizen of France, residing at Paris, Department of Seine, France, have invented certain new and useful Improvements in Single-Phase Dynamo-Electric Machines, of which the following is a specification.

My invention relates to single-phase alternating-current machines of the type having a field-magnet excited with direct current, and has particular reference to single-phase rotary converters, though it is not limited to this particular application.

It is well known in the art that polyphase rotary converters can be readily designed to operate sparklessly over wide variations of load, while more difficulty is experienced in designing single-phase rotary converters to operate without sparks at the commutator. The reason for this is that the polyphase currents in the armature are equivalent in their magnetizing effects to a direct current equal and opposite to the direct current which is delivered by the commutator, or, stated in other words, both the alternating-current input and the direct current output are constant and always balance each other. Consequently there is, theoretically, no armature reaction in a polyphase rotary converter, and in practice such converters will carry large overloads with a weak field and without sparking. Obviously the balance between the alternating and direct currents cannot exist in a single-phase rotary converter, since the direct-current output is constant, while the alternating-current input is varying from zero to a quantity above the direct-current output. Fluctuations in the distribution of the armature-current are thus produced, and these fluctuations produce an armature reaction which tends to shift the field magnetization back and forth with double the frequency of the alternating currents. This armature reaction increases with the load and renders it extremely difficult to design a single-phase rotary converter that will carry a proper load. In order to remedy this difficulty with single-phase rotary converters, it has been proposed heretofore to provide short-circuited conductors in inductive relation to the armature to act as damping-windings for damping out the fluctuations, and this arrangement has improved the operation of the machines.

My invention consists in providing a novel form of field-winding and connections therefor, such that the field-winding itself may act as a damping-winding.

More specifically considered, my invention consists in providing the armature with a distributed field-winding instead of the usual polar winding and short circuiting equipotential points on this distributed winding. This short-circuit between the equipotential points, while it is of no effect as regards the direct-current excitation, acts in conjunction with the field-winding to produce efficient damping of the armature fluctuations.

My invention will best be understood by reference to the accompanying drawing, which shows diagrammatically a single-phase rotary converter arranged in accordance with my invention.

In the drawing, $a$ represents a source of alternating current connected, through the switch S, to the collector-rings C, which are connected to fixed points on the armature-winding A. The armature-winding A is also provided with a commutator and commutator-brushes, to which are connected the direct-current mains $d\, d$, through which the direct-current output of the machine is supplied to the load.

F represents the field-winding, which is connected in shunt to the direct-current mains $d\, d$, with a field-rheostat R in series with it. The field-winding F instead of being the usual form of polar-winding is a distributed winding, which in the drawing is shown as a Gramme ring. It will be understood, however, that any other well-known form of distributed winding may be employed, such as a distributed drum-winding placed in slots on the inner periphery of the field structure, which is a common construction in alternating-current machines. The equipotential points $e\, e$ on the field-winding are connected by a short-circuiting conductor $f$. It will be seen that while this conductor has no effect as regards the direct-current excitation, since the points *e e* are equipotential with regard to this excitation, nevertheless this conductor, together with the field-winding itself, forms a short circuit in inductive relation to the armature, which consequently serves efficiently to damp out fluctations due to armature reaction. In this manner the magnetization of the machine is maintained more nearly constant, and the sparking at the commutator is greatly reduced.

Although I have shown my invention as applied to a bipolar machine with Gramme ring windings on both members, it will be understood that my invention is applicable to machines having any number of poles and, as has been pointed out heretofore, with any well-known form of distributed winding. Furthermore, although I have shown only one short circuit connecting two equipotential points, it is obvious that other equipotential points on the field-winding may be similarly connected, if desired. Accordingly I do not desire to limit myself to the particular construction and arrangement of parts shown; but I aim in the appended claims to cover all modifications which are within the scope of my invention.

What I claim as new, and desire to secure by Letters Patent of the United States, is—

1. In a dynamo-electric machine, a distributed field-winding connected to a source of direct current, a single-phase armature-winding, and a conductor short-circuiting equipotential points in the field-winding.

2. A single-phase rotary converter having a distributed field-winding, and a conductor connecting equipotential points on said winding.

3. In a dynamo-electric machine, a distributed field-winding, an armature provided with commutator and collector-rings, a source of single-phase current connected to said rings, and a conductor short-circuiting equipotential points on the field-winding.

In witness whereof I have hereunto set my hand this 18th day of August, 1904.

MARIUS CHARLS ARTHUR LATOUR.

Witnesses:
   HANSON C. COXE,
   JOHN BAKER.